United States Patent [19]

Larson et al.

[11] 4,063,196
[45] Dec. 13, 1977

[54] PLURAL OSCILLATOR PHASE CONTINUOUS FREQUENCY ENCODER

[75] Inventors: Elden Roger Larson, Bloomington; Robert Donald Dreher, Roseville, both of Minn.

[73] Assignee: Control Data Corporation, Minneapolis, Minn.

[21] Appl. No.: 741,321

[22] Filed: Nov. 12, 1976

[51] Int. Cl.² .............................................. H03C 3/02
[52] U.S. Cl. ................................ 332/16 T; 325/163; 331/49; 331/56; 331/117 R; 331/179; 332/21; 332/23 R
[58] Field of Search ............... 331/49, 56, 117 R, 168, 331/179; 332/16 R, 16 T, 21, 22, 23 R, 9 R, 9 T; 325/30, 163, 169

[56] References Cited
U.S. PATENT DOCUMENTS 2,840,713   6/1958   Wulfsberg .............................. 331/49
3,533,019   10/1970  Knirsch ............................. 331/49 X

OTHER PUBLICATIONS

Stewart, "Parallel-Network Oscillators", Proceedings of the IRE, vol. 43, May 1955, pp. 589-595.

Primary Examiner—Siegfried H. Grimm
Attorney, Agent, or Firm—William J. McGinnis, Jr.

[57] ABSTRACT

A frequency modulation oscillator is provided having three or more output frequencies corresponding to three or more possible input signals, the output frequency being a phase continuous frequency modulated signal with no discontinuities. For each desired output frequency, there is an input amplifier, responsive to an input binary signal, the output of that amplifier being summed with the outputs of the other amplifiers. For each input amplifier there is an active feedback network containing a delay element which will produce oscillation in the associated amplifier, the active feedback network from each amplifier being isolated from the other amplifiers and feedback networks.

6 Claims, 4 Drawing Figures

PLURAL OSCILLATOR PHASE CONTINUOUS FREQUENCY ENCODER

BACKGROUND OF THE INVENTION

This invention relates to a multilevel frequency modulation encoder which may form the modulator or transmitter portion of a modem (modulator-demodulator). Such an encoder may be used to transmit binary data on a data link at a predetermined frequency. While two level devices of this general type are known, this disclosure relates to three or more level encoding.

The type of device covered in this disclosure also has other technical descriptions which may be applicable. Sometimes these devices may be known as phase continuous oscillators, making reference to the fact that there is no discontinuity in the oscillator output when shifting from one frequency to another. A device of this type may also be known as a self-synchronizing oscillator, making reference to the fact that no external source of frequency is required to produce the desired signal output. And finally, the subject of the disclosure may also be referred to as a parallel network oscillator in that there are as many frequency determining elements in the oscillator as there are desired output frequencies and that the frequency determining elements are arranged in somewhat parallel electrical configuration.

To further define the scope of this disclosure, devices of the type described herein may be used as data transmission elements according to a substantial number of different encoding schemes. The method or scheme of encoding binary signals to produce a three frequency output is not material to the subject matter of this disclosure. The literature on this subject is replete with different ternary alphabets and the advocates for each stress the advantages with respect to differing criteria for error-free data transmission. It is sufficient to say that there is at least one acceptable method of transmitting binary data using a three frequency modulated carrier, that method being a return-to-zero modulation scheme in which the center frequency indicates the absence of data transmission, but represents a clock signal, the higher frequency indicates a binary zero or one and the lower frequency indicates the opposite condition from the higher frequency. This particular method of encoding provides clock timing pulses for the receiving unit together with the data information and provides certain advantages in a network system where a plurality of terminals may be communicating with a single or with multiple computers. Naturally, there are extensive possibilities for different encoding alphabets when more than three frequencies are available for modulation.

One appropriate use of a device according to the disclosure herein would be for encoding data for transmission on a cable television system of the type commonly found today in metropolitan and even rural areas. Such a device could make use of the fact that the cable television channels presently in use in cable television systems leave an unoccupied frequency spectrum in each television channel. The unused bandwidth in a particular television channel may be as much as several megahertz. Alternatively, extra channels are available for various purposes, and certain channels could be dedicated to data transmission. Thus, a system according to the Disclosure herein may be designed to have, for example, a center frequency of 68 megahertz, a lower frequency of 64 megahertz, and an upper frequency of 72 megahertz.

It goes without saying, that the needs of our modern society will require greater and greater utilization of data processing and transmission equipment. Naturally, a significant requirement of such equipment will be the minimum expenditure of capital to establish a reliable and effective method of communication of data. In many cities in the United States, and in other places as well, cable television systems are being established for the principal purpose of relaying television signals through high frequency cable transmission systems to individual subscribers. One requirement of almost all such systems has been the availability to subscribers of the means for inserting subscriber signals into the systems which may be received by other subscribers. While this principal purpose has been related to the communication of television pictures, together with an audio signal, data transmission within such a system between subscribers is also possible where the data transmission equipment is compatible with the characteristics of the television channel and with limits and the transmission capabilities of the existing cable system.

Among the factors and requirements of such a system are that time delays and distortions may occur in transmitted data, therefore making desirable a method of data transmission which contains its own internal timing signals. Another requirement of the cable transmission system is a comparatively narrow, or at least confined, bandwidth for transmitted data. Thus, there is imposed a requirement, known to those familiar with communications theory, that the transmitted data signals have no sharp discontinuities or breaks of the type which require a comparatively high bandwidth for transmission. Thus, any transmission into a cable system of the type described would require phase continuous modulation where the transitions from one frequency to another are smooth, both in the literal sense referring to the image which would be displayed on an oscilloscope display of the data transmission and in the sense of communications theory with respect to the bandwidth required to transmit such a signal.

Included in the relevant prior art in this area is the following article which is known to applicant:

Article entitled "Parallel-Network Oscillators", by J. L. Stewart, Proceedings I.R.E., Vol. 43, No. 5, pages 589–595, May 1955.

Applicant is also aware of the following U.S. Patents which show developments in the general field of the present invention but which are believed not to anticipate the present invention: U.S. Pat. Nos. 3,852,681; 3,564,448; 3,458,835 and 3,411,107. These patents describe devices which have a common output and are driven by a collection of gating circuits and delay lines. A somewhat similar circuit to a circuit embodying the present invention is shown in U.S. Pat. No. 3,411,107 which uses monostable oscillators and electrically selected delay lines to generate several output frequencies. The circuit is similar to a circuit embodying the present invention in that it gates multiple delay paths to a common output. The patent, however, shows tapped delay lines and pulse generators not similar to the present invention. Furthermore, the present invention involves an oscillator producing a plurality of different frequencies in response to control signals and does not incorporate the concept of the majority decision circuit shown in the subject Patent. Of all of the above referenced prior art, the I.R.E. article is believed to be the most relevant. That article, however, in discussing two oscillator networks clearly states that while three oscillator networks are possible, their development does not appear practical. The subject article contains substantial theory but does not show the added features of active isolated feedback amplification of the present invention, which features are shown both in the system diagram and in the actual circuit schematics of the embodiment described.

SUMMARY OF THE INVENTION

The present invention is illustrated in an embodiment where three different frequencies may be selectively produced from a multilevel frequency modulation encoder. However, the principles of the present invention allow for additional frequencies to be produced from an encoder having additional circuits of the type incorporated in the three level encoder. The encoder, according to the present invention, has a binary, on-off, input signal for each desired frequency output. Each input signal controls an input amplifier, the output of which is summed with the other input amplifiers. This summation may occur by a simple interconnection of the outputs of the individual amplifiers or various isolation techniques may be used. The signal at the summation represents the output signal of the oscillator.

From this summation signal, there is an active feedback network which is isolated from the summed signal for each of the input amplifiers. The feedback network contains a delay element such that the input amplifier together with its feedback network form an oscillator at a predetermined frequency. The operation of the various input amplifiers and feedback networks is such that when one amplifier is gradually turned off and another amplifier gradually turned on, the frequency shifts gradually from the frequency of the first amplifier feedback combination to that of the second amplifier feedback combination. The feedback networks associated with each amplifier are active and contain an amplifier which is on at all times. Thus, as one of the input amplifiers is gradually being turned on and another is gradually being turned off, the effective oscillation frequency of the oscillator is determined by a combination of the delay elements in the associated amplifiers.

In the embodiment of the invention shown herein, the input amplifiers consist of common emitter differential amplifiers which are turned on or off by a transistor switch which has its collector coupled to the emitters of the associated differential amplifier transistors. The collectors of one of the pairs of transistors forming all of the differential amplifiers are connected together and constitute an output of the oscillator circuit which is emitter coupled to an output transistor amplifier. The collectors of all of the other of the transistors in the transistor pairs comprising the differential amplifiers are connected together in a summation configuration and emitter coupled to the individual transistors comprising the feedback amplifiers in the feedback network associated with each of the differential amplifiers. The transistors in the feedback amplifiers operate in common base mode. The feedback path consists of capacitive and inductive elements connected between the collectors of the feedback amplifier transistors and the base of one of the transistors comprising the pair of transistors forming the differential amplifier associated with each of the frequency producing elements in the encoder according to the present invention.

Also shown, is an appropriate signal source for the encoder according to the present invention which will form conventional clock and binary data signals into the pulses of an appropriate shape to smoothly cause the encoder according to the present invention to shift among the various possible frequencies.

DESCRIPTION OF THE PREFERRED EMBODIMENT

Figure 1:
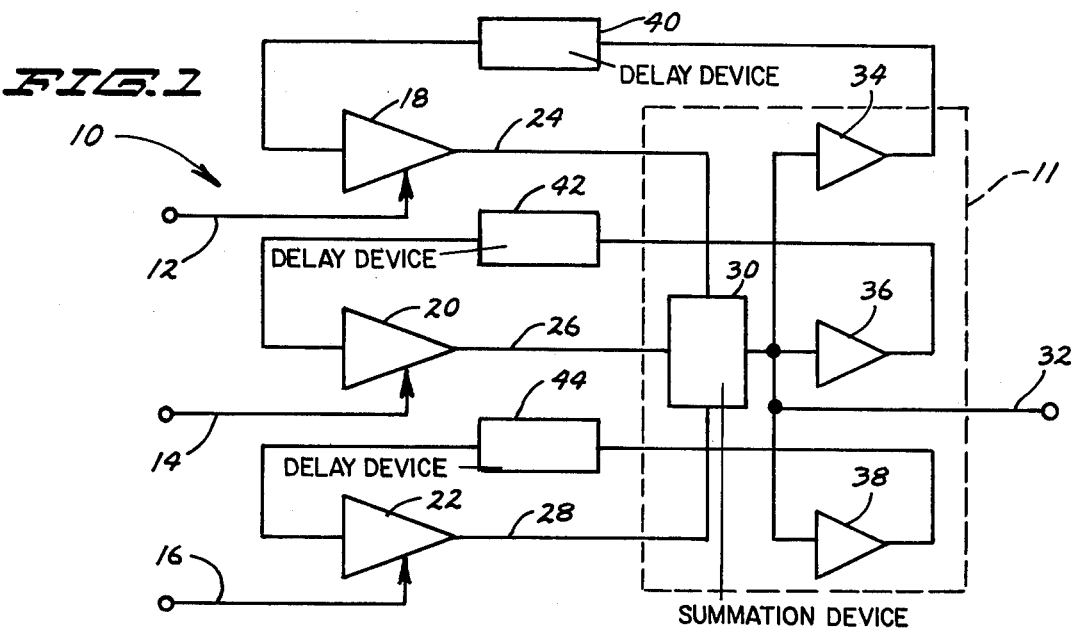
FIG. 1 is a schematic diagram of the system function of a frequency modulation encoder according to the present invention.

Referring now to FIG. 1, a system diagram, a three level encoder 10 according to one embodiment of the present invention is shown. The encoder includes a summation and active feedback network 11, shown inside dotted lines. This three level encoder receives binary input signals on input lines 12, 14 and 16. These binary control lines are binary in the sense that they either have a signal present or there is no signal. The three input lines, 12, 14 and 16, are each associated with an amplifier 18, 20 and 22, respectively. These input lines are used to control the respective amplifier so that it will either be in an active on state or in an inactive off state. This control may function by simply turning on and off the power supply to the amplifier, for example, or by enabling and disabling the input to the amplifier. The amplifiers each have an output signal line 24, 26 and 28, respectively, all of which are connected to a summation device 30. The summation device provides a signal on an output line 32 which is the output signal of the encoder according to this embodiment of the invention.

Also connected to the output of summation device 30 is an amplifier 34 associated with amplifier 18, an amplifier 36 associated with amplifier 20 and an amplifier 38 associated with amplifier 22. Amplifier 34 has its output connected through a delay device 40 to an input of amplifier 18, amplifier 36 has its output connected through a delay device 42 to the input of amplifier 20 and amplifier 38 has its output connected through a delay device 44 to the input of amplifier 22. Amplifiers 34, 36 and 38 are on at all times the circuit is in operation. At a time when one of the input amplifiers is activated by an input signal, the amplifier plus its active feedback network consisting of one of the feedback amplifiers 34, 36, or 38 and the associated delay device form an oscillator. The active feedback amplifiers associated with the other inactive input amplifiers serve as isolation devices to prevent the other delay elements associated with the inactive input amplifiers from having any effect on output oscillations which are produced by the combination of the input amplifier and the associated delay device. Thus, by proper selection of the elements forming the tuned circuit of each delay device three different primary oscillation frequencies may be established. In a way to be described in connection with specific circuit diagrams shown in FIGS. 2A, 2B and 3, the input signals are caused to smoothly change from the on condition to the off condition and vice versa so that the output signal on output 32 smoothly transforms from one primary frequency to the another primary frequency as input voltages undergo a smooth transition. It may be shown, although the proof is not relevant to this patent application, that when at least two of the primary amplifiers are in a partially activated or transition condition, the output oscillations will occur at a single frequency between the primary frequencies associated with the respective circuits. It is to be noted that this partially on condition represented by the smooth transition from an on state to an off state, and vice versa, for each of the primary oscillators of this circuit is to be present only a small fraction of the total operating time of the circuit in the data transmission function.

Figure 2A:
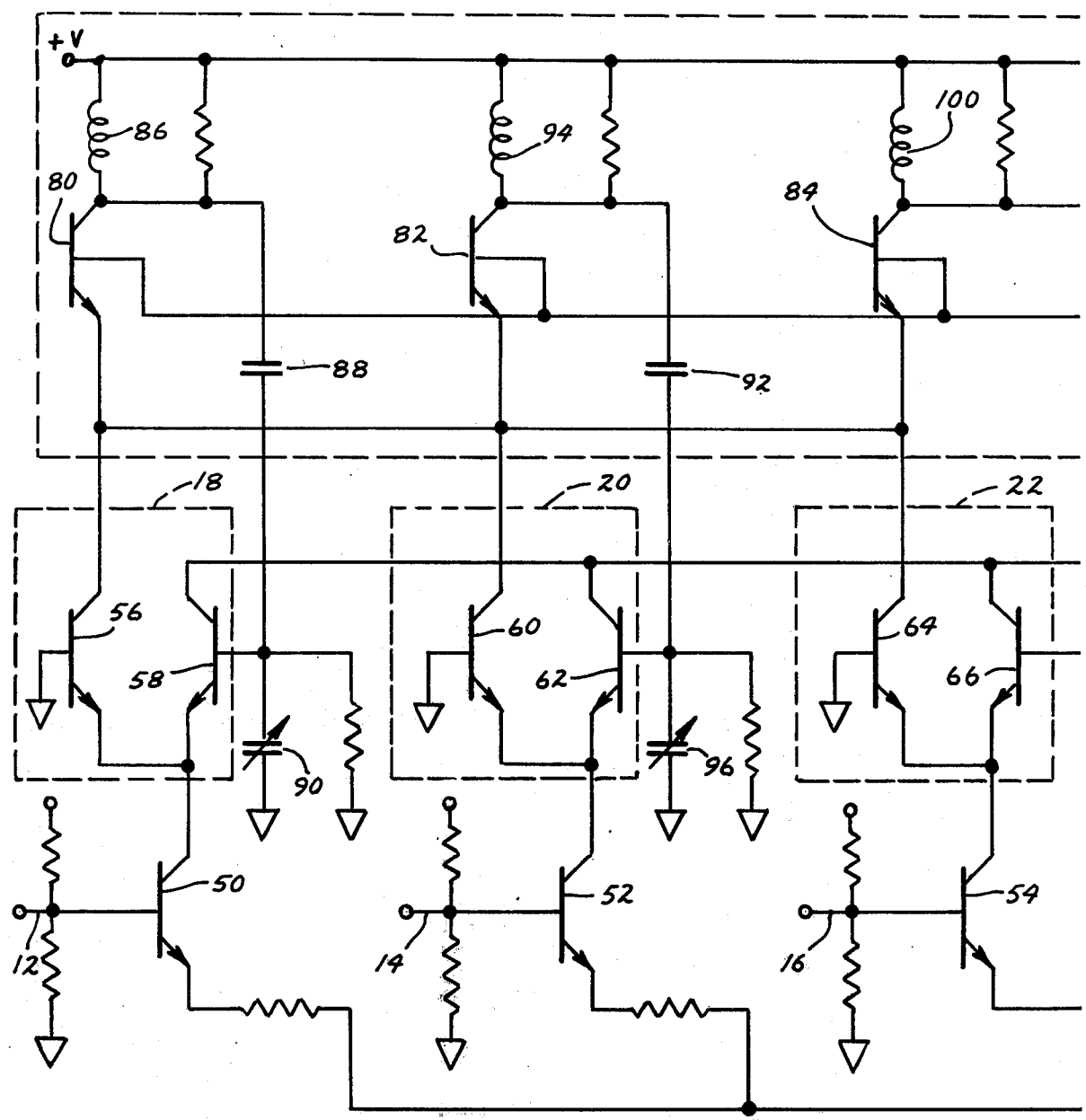
FIGS. 2A and 2B are a schematic diagram of a circuit according to the present invention having three output frequencies designed to be placed together with FIG. 2A to the left of FIG. 2B.
Figure 2B:
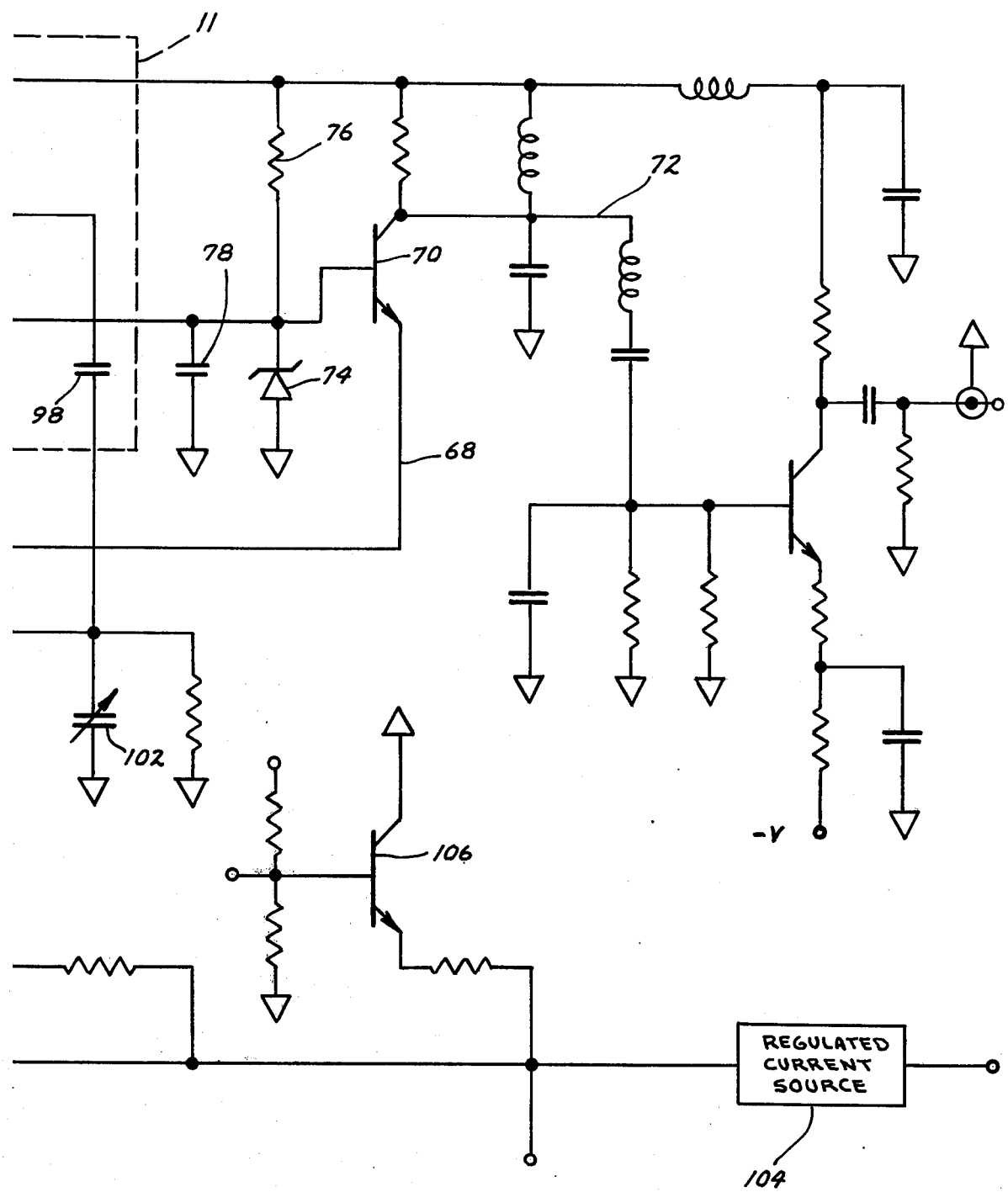

Referring now to FIGS. 2A and 2B, a transistor circuit is shown according to an embodiment of an invention having three primary frequencies and a system function generally as shown in FIG. 1. The system may have, for example, specific components so that the center frequency would be sixty-eight megahertz, with four megahertz separation between the upper and lower frequencies. Accordingly, the three input control signals 12, 14 and 16 are shown as being presented to the base of switching transistors 50, 52 and 54, respectively. The bases of these switching transistors are shown with an appropriate bias network which would include an appropriate supply voltage. The collectors of these three switching transistors are connected to the emitters of a pair of associated transistors operating as a differential amplifier. Associated with switching transistor 50 are differential amplifier transistors 56 and 58, with switching transistor 52 are associated differential amplifier transistors 60 and 62 and with switching transistor 54 are associated differential amplifier transistors 64 and 66. The outputs of these amplifiers are electrically isolated and of opposite phase. Transistors 56 and 58 constitute input amplifier 18 shown in the system diagram of FIG. 1, and similarly transistors 60 and 62 constitute amplifier 20 and transistors 64 and 66 constitute amplifier 22. The collectors of transistors 58, 62 and 66 are connected together so that their output signals are summed. These signals are summed on an output bus 68 which is emitter coupled to an output amplifier transistor 70. The output of the circuit is taken from the collector of transistor 70 on an output bus 72. In practice, a harmonic isolation and suppression filter and amplifier circuit such as shown in FIG. 2B would be used for the final output, but further description is not believed necessary here. Transistor 70 operates as a common base amplifier with its base connected to a regulated voltage determined by a zener diode 74. Current to the zener diode is provided by a resistor 76. A capacitor 78 having a capacitance large with respect to the signals being handled is connected across the zener diode so that with respect to the signal frequencies the base of transistor 70 is a common base connection.

The summation and active feedback network 11 is shown generally inside dashed lines. Transistor 80 represents a common base, emitter coupled amplifier forming the active element in the feedback network associated with amplifier 18. Similarly, transistors 82 and 84 represent common base, emitter coupled amplifiers forming the active elements in the feedback networks for amplifiers 20 and 22, respectively. In this embodiment of the invention, the bases of transistors 80, 82 and 84 are connected to the same reference voltage source as the base of transistor 70 for convenience, but separate sources may be provided. This reference source comprised of zener diode 74 and resistor 76 provides the appropriate direct current bias voltage for these transistors while capacitor 78 connects signal frequencies to ground in order to implement the common base configuration of the amplifiers. The collectors of transistors 56, 60 and 64 are connected together so that their output signals are summed. This summed signal provides the emitter input for transistors 80, 82 and 84. Although this signal is out of phase with the system output, it is still a summed output from the differential amplifiers and has the further advantage of providing additional signal isolation and stability within the circuit over other possible configurations.

Associated with amplifier 18 and feedback amplifier transistor 80 are a coil 86 and a capacitor 88 forming the feedback network delay element. Capacitor 88 is connected between the collector of transistor 80 and the base of transistor 58. Capacitor 88, together with coil 86 and variable capacitor 90, form a conventional resonant circuit which according to standard network theory is a delay element associated with an amplifier to make the combination thereof resonant. Similarly, capacitor 92 connects the collector of transistor 82 to the base of transistor 62 and together with coil 94 and variable capacitor 96 form the resonant circuit associated with amplifier 20. Similarly, capacitor 98 connects the collector of transistor 84 with the base of transistor 66 and together with coil 100 and variable capacitor 102 form the resonant circuit associated with amplifier 22. A regulated current source 104 provides current to the emitters of transistors 50, 52 and 54. The regulated current source insures that the amplifier gain will be constant and insures frequency stability of the circuit. Since the encoder according to the present invention may be used in data terminals as an encoder in an environment where the unit must be activated, or turned on rapidly and in a stable fashion in order to respond to a comand from a master unit, transistor 106 is provided to create a drain on the current source when the unit is in the non-transmitting mode and none of transistors 50, 52 and 54 are activated. When the unit is turned on by the activation of one of transistors 50, 52 and 54 together with the turning off of transistor 106, the current source 104 will experience a relatively constant current drain and thus will not create any instability in the output signal of the encoder.

Figure 3:
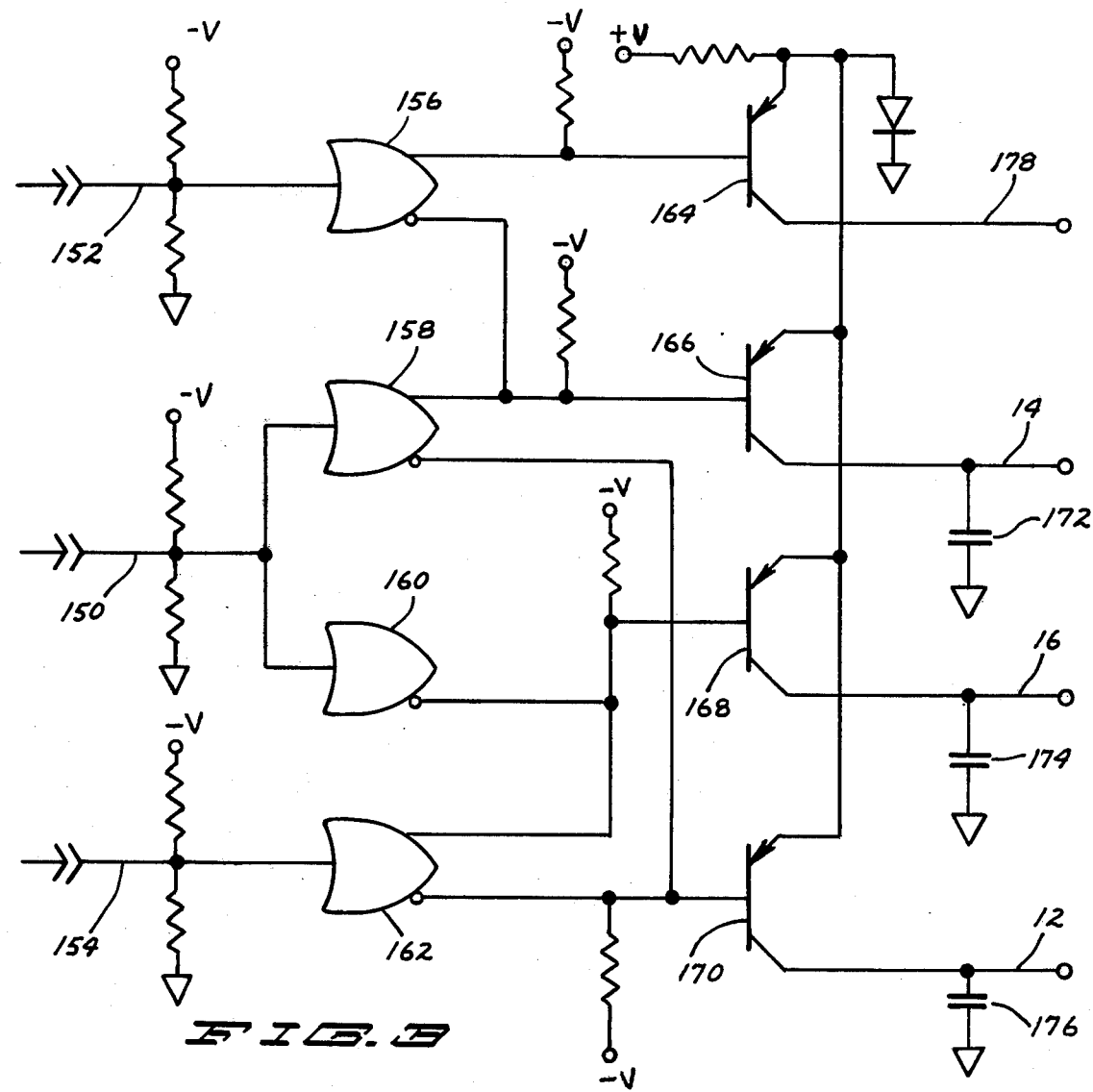
FIG. 3 is a signal source for controlling the encoder shown in FIG. 2 based on a conventional binary data input.

Referring now to FIG. 3, a suitable circuit is shown for driving encoder 10 shown in FIGS. 2A and 2B. Signals appearing at outputs 12, 14 and 16 correspond to properly shaped binary signals for turning on and off the low, middle and high frequencies, respectively, of encoder 10 and correspond to inputs 12, 14 and 16 on FIGS. 2A and 2B. Input 150, in FIG. 3, corresponds to a periodic clock signal which may be provided continuously. Input 152 is for the transmit-receive control signal and is equivalent to an on-off signal for turning the encoder on and off. Input 154 is for conventional binary data signals. OR gates 156, 158, 160 and 162, with the NOT outputs thereof designated by the small circle symbol, provide the necessary logic function to convert the conventional clock and binary data signals to a combined three logic and clock signal. Transistors 164, 166, 168 and 170 receive the logic outputs from OR gates 156, 158, 160 and 162 and drive outputs 12, 14 and 16. Capacitors 172, 174 and 176 shape the output pulses from the associated transistors to provide a smooth transition from one output frequency to another of encoder 10. Output 178 drives transistor 106, shown in FIG. 2B, associated with an off condition of encoder 10 to provide a steady drain on regulated current source 104. That is, when encoder 10 is to be off, output 178 provides a signal to turn transistor 106 on. When the encoder 10 is to produce an output signal, one of the outputs 12, 14 or 16 will be on. Capacitors 172, 174 and 176 may have a value of 270 picofarads, for example, to provide the desired pulse shaping characteristics in a resistive capacitive network configuration. The bias network of transistors 50, 52 and 54 will have an input impedance of approximately a few hundred ohms to fully determine the frequency response characteristics of the circuit, thereby determining pulse shapes for driving the encoder. The logic elements, together with the drive transistors, create a combination which will cause one oscillator to be smoothly turned off and essentially simultaneously cause another oscillator to be smoothly turned on so that a smooth and continuous shift from one primary frequency to another will occur. Essentially simultaneously as used here does not mean exactly simultaneously, but means "at the same time within limits of tolerance to make the circuit function as intended."

What is claimed is:

1. A frequency modulation oscillator for encoding data having at least three primary frequencies and comprising
   at least three input amplifiers,
   switch means associated with each of said input amplifiers for activating said associated amplifier in response to an input control signal,
   a plurality of feedback amplifiers, one of said feedback amplifiers being associated with each of said input amplifiers and having an output, the inputs of all of said feedback amplifiers being connected in common to an input signal comprised of the electrical summation of signals from each of said input amplifiers,
   a plurality of feedback means, one feedback means being connected between the output of each feedback amplifier and an input of the associated input amplifier and having an electrical characteristic such that said input amplifier acts as an oscillator at a predetermined primary frequency when activated,
   the output of said frequency modulation oscillator being comprised of a signal which is the electrical sum of output signals from all of said input amplifiers and having the characteristic of being an oscillating signal at the primary frequency of an activated input amplifier when only one of said amplifiers is activated and having the further characteristic of consisting of a continuous frequency oscillating signal shifting from a first primary frequency to a second primary frequency when a first input amplifier is smoothly deactivated as a second input amplifier is essentially simultaneously smoothly activated.

2. The oscillator of claim 1 and further comprising means for supplying data signals which have a smooth signal characteristic to all of said switch means.

3. The oscillator of claim 1 comprised of only three input amplifiers.

4. A data encoder comprising:
   at least three oscillators, each oscillator responsive to an input control signal to produce an output signal and each oscillator having a different primary frequency,
   each of said oscillators including a feedback means and a feedback amplifier, each feedback amplifier having as an input a signal comprising the electrical sum of the outputs of all of said oscillators, said input being electrically isolated from the output of said feedback amplifier, the output of said feedback amplifier being connected through said feedback means to the associated oscillator, and,
   means for electrically summing the output signals of all of said oscillators to produce an output signal for said encoder.

5. The encoder of claim 4 and further comprising a plurality of means for activating and deactivating oscillators, one of said means being associated with each of said oscillators to provide an input signal, said input signal being essentially either an on signal or an off signal, and said input signals having the further characteristic of switching smoothly from on to off and off to on so that when a first oscillator is operating at a first primary frequency and is smoothly deactivated while essentially simultaneously a second oscillator is smoothly activated to a second primary frequency the output signal of said encoder will consist of a continuous frequency oscillating signal smoothly shifting from said first frequency to said second frequency.

6. The encoder of claim 5 consisting of only three oscillators.

* * * * *